United States Patent Office 3,526,378
Patented Sept. 1, 1970

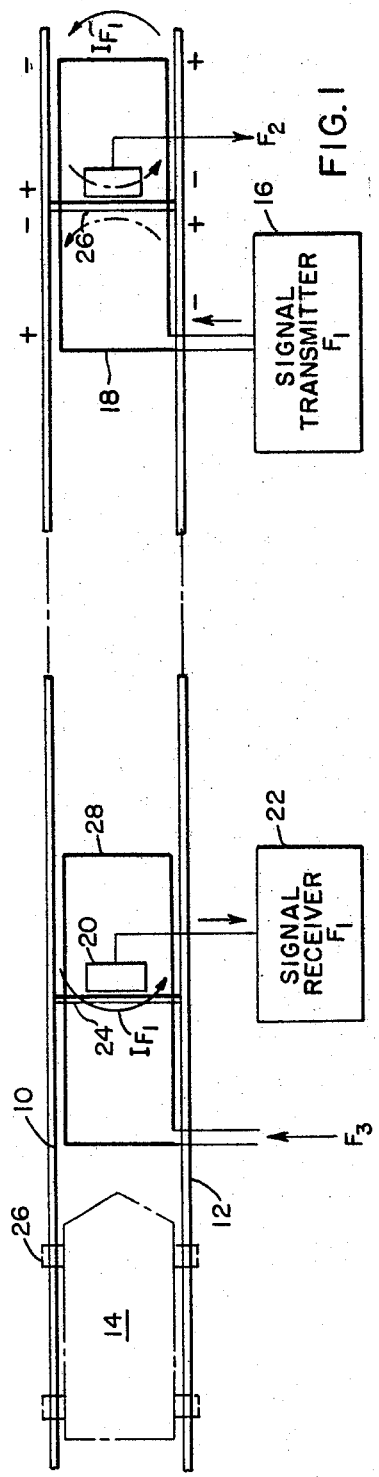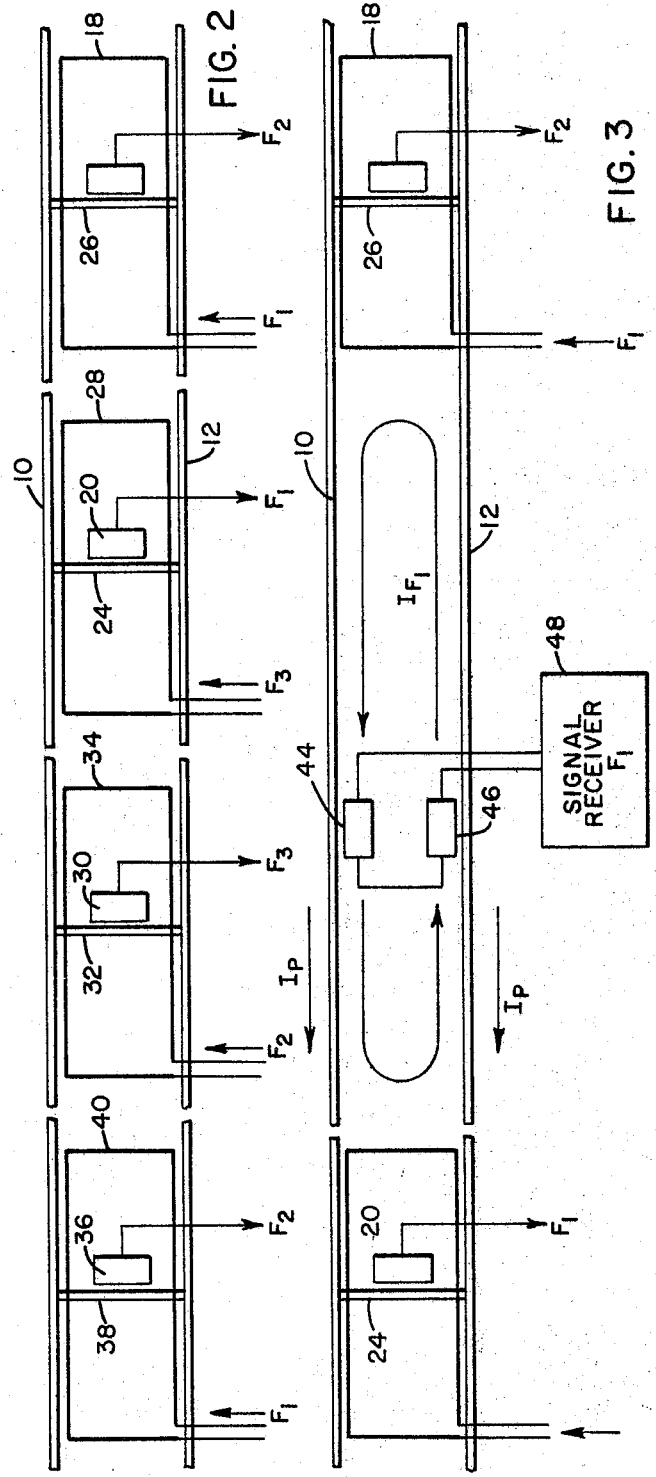

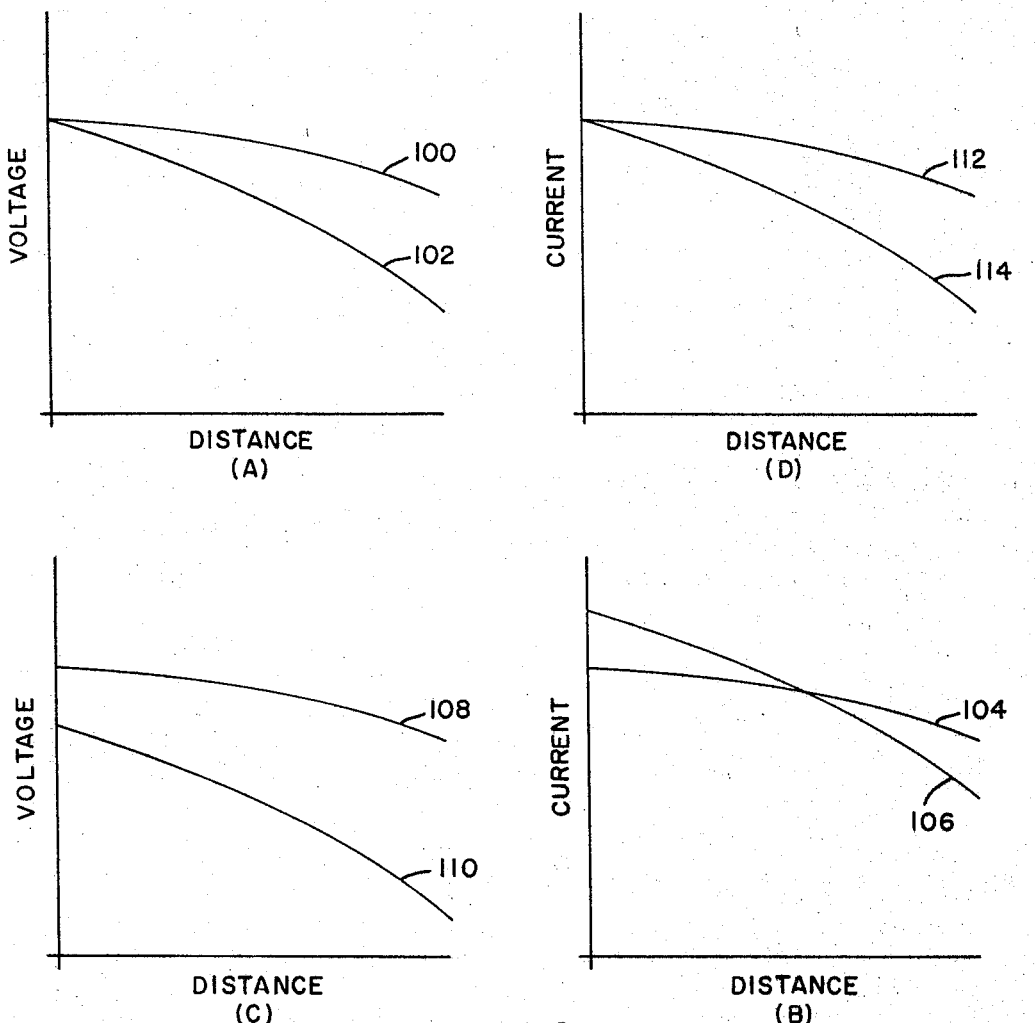
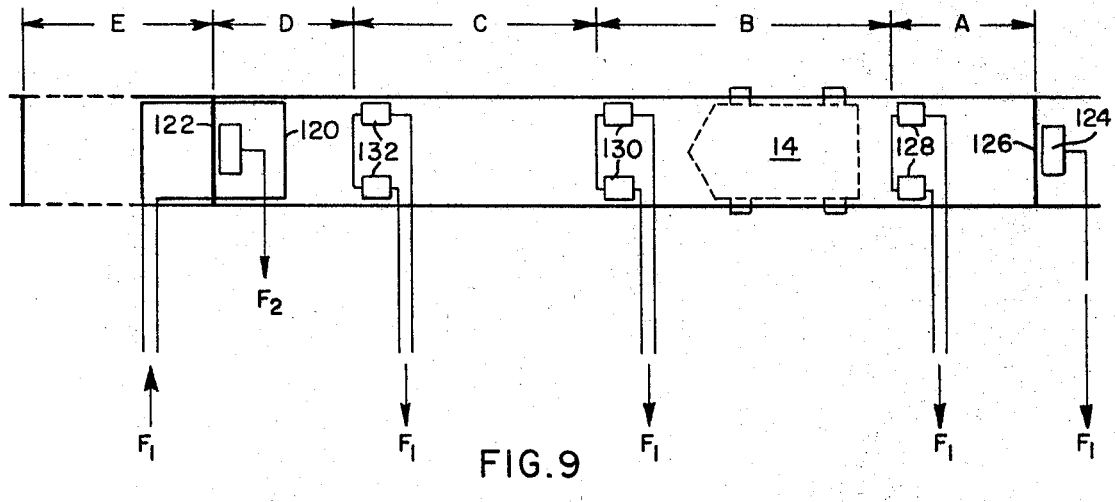
FIG. 8
FIG. 9

3,526,378
SIGNALING SYSTEM FOR DETERMINING THE PRESENCE OF A TRAIN VEHICLE
George M. Thorne-Booth, Murrysville, Pa., assignor to Westinghouse Electric Corporation, Pittsburgh, Pa., a corporation of Pennsylvania
Filed Aug. 23, 1967, Ser. No. 662,711
Int. Cl. B61l 21/00
U.S. Cl. 246—34
12 Claims

ABSTRACT OF THE DISCLOSURE

Audio frequency signals, operative with track circuits for the purpose of sensing the presence of a train vehicle in any signaling block circuit, are modulated for fail-safe speed control of train vehicles and for train operation information transmission.

The train track is divided into signaling blocks of predetermined length, with a very low impedance short circuit connection placed across the track rails at the ends of each such block. A signal transmitter operating at one of several audio carrier frequencies, with its output modulated at a subaudio rate, is coupled to the rails across the short circuit connection at one end of each block. One or more cooperative signal receivers are coupled to the short circuit connection at the remote end of each block; intermediate receivers are coupled to the rails as required for desired train control.

CROSS REFERENCE TO RELATED APPLICATIONS

The present invention is related to the invention covered by a copending patent application entitled "Remote Signaling System," Ser. No. 637,683 filed May 11, 1967 by C. S. Miller and a second copending patent application entitled "Train Control Antenna and Cable System," Ser. No. 637,684 filed May 11, 1967, by G. M. Thorne-Booth.

BACKGROUND OF THE INVENTION

It has for some time been the practice in the operation of train control signaling systems to divide the track into a plurality of signaling blocks that are electrically insulated from each other. However, more recent train systems are beginning to use welded tracks involving longer sections of rails that are not adapted for the use of insulated joints, and train presence determination is more difficult with such a train system.

It is generally desired for fail-safe operation that any signaling equipment failure or combination of failures must result in a track occupied signal to keep following trained vehicles always separated by safe intervals. Additionally it is desired that train position and movement be monitored very precisely at certain portions of track such as location where a train vehicle can enter or leave the track section or where a train vehicle is approaching or within a station.

SUMMARY OF THE INVENTION

In accordance with the present invention, the track upon which the controlled train vehicle travels is separated into a plurality of signaling blocks, with each block being defined by low impedance, short circuiting conductors interconnecting the tracks for one particular purpose of equalizing the flow of relatively large propulsion currents passing through the two rails of the track. Electrically insulated joints are generally not provided within each rail member. Control signal transmitters are provided to couple control signals into provided track circuits, with said control signals being introduced at the location of the short circuiting conductors. One or more cooperating signaling receivers are positioned along the track at positions defined by the signaling blocks to determine the presence of any train vehicle between a given transmitter and its associated receiver. The present signaling system does not rely upon the attenuation of the control signal by the impedance of the rails for block separation and isolation, but instead utilizes the low impedance short circuiting conductors for this purpose. Therefore a fewer number of discrete signal carrier frequencies are required.

For the purpose of train vehicle presence detection within any signaling block, the control signal transmitter and cooperative receivers can be located at the wayside of the track.

An air core transformer is used to couple the track circuit signal transmitter power into the short circuiting conductor placed between the rails at the end of each track circuit signaling block. This transmitter is frequency shift keyed and generates power continuously at one or the other of two frequencies. A total of six frequencies are utilized for track circuit operation with two such frequencies being obtained with each transmitter by modulation of its frequency.

BRIEF DESCRIPTION OF THE DRAWINGS

FIG. 1 is a schematic showing of one embodiment of the present signaling system;

FIG. 2 is a schematic showing of the successive signal transmitter and cooperative signal receiver interrelation to the vehicle track;

FIG. 3 illustrates the induced current provided by a signal transmitter and sensed by a receiver located at the remote end of the signaling block and by a receiver located within that signaling block;

FIG. 8 illustrates the practical operation of various signaling systems, with FIG. 8a and 8b relating to constant voltage source systems and FIGS. 8c and 8d relating to constant current source systems;

FIG. 9 shows a signal receiving antenna arrangement wherein at least one intermediate receiver antenna is provided;

In FIG. 1 there is provided a schematic showing of one embodiment of the present signaling system including two rails 10 and 12 which may be substantially continuous and comprise a plurality of welded sections with no insulating joints therebetween. A train vehicle 14 is provided to move along the track. A signal transmitter 16 operating at a frequency $F_1$ is connected to energize an antenna 18 such that there is induced within the rails 10 and 12 a signal at frequency $F_1$. With the train vehicle 14 shown in its position to the left of the antenna 20 operative with a signal receiver 22 adapted to receive the track signal at frequency $F_1$, the signal receiver 22 is operative to receive the signal $F_1$ at a high magnitude to indicate that the train vehicle is not positioned between the location of the antenna 18 and the receiving antenna 20. It should be noted that the receiving antenna 20 is coupled to a short circuiting bar or conductor 24 which is electrically connected between the rails 10 and 12 at the location of the receiving antenna 20. A similar short circuit bar or conductor 26 is electrically connected between the rails 10 and 12 at the location of the antenna 18. However it should be noted that the antenna 18 is positioned such that the conductor 26 does not interfere with the coupling of the track signal $F_1$ from the signal transmitter 16 into the rails 10 and 12. As shown in FIG. 1, the configuration of antenna 18 is inherently cooperative with the physical form of conductor 26 to result in the local signal being introduced into the rails with components of introduced signal potential acting in a series opposing relationship in a circuit through conductor 26, but in a series aiding relationship in a circuit through conductor 24 and through the conductor (not shown) at the entrance end of the signal block to the right of conductor 26. To diagrammatically illustrate this inherent cooperation, there is shown on the drawing the polarities of voltages impressed upon the expanses of rails 10 and 12 by the sides of the rectangular loop 18 parallel thereto, for an instantaneous signal condition, as well as solid line arrows representing signal flow and phantom line arrows illustrating the counterbalancing effect through conductor 26. The receiving antenna 20 is operative to sense the track signal at frequency $F_1$ which is flowing in the short circuit conductor 24 between the rails 10 and 12.

Figure 4:
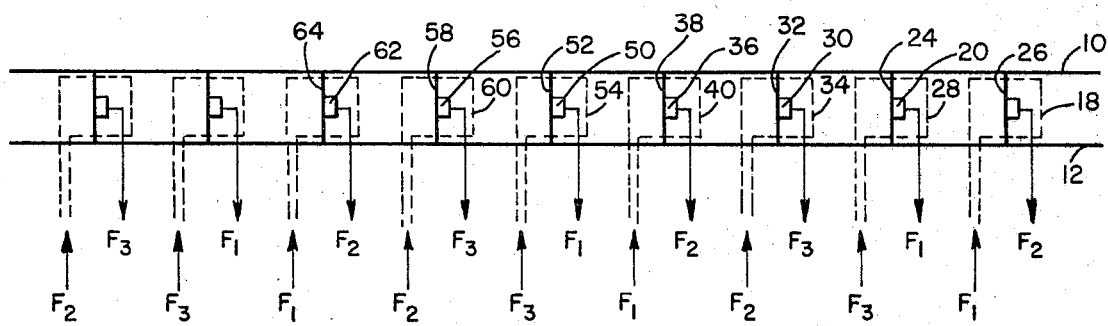
FIG. 4 shows a typical successive plurality of signaling blocks.

However, when the train vehicle 14, moving in a direction from left to right, passes the location of the short circuit connection or conductor 24, and more specifically when the front wheels 26 of the train vehicle 14 passes the location of the short circuiting conductor 24, the front wheels 26 provide a short connection between the rails 10 and 12 such that a substantially smaller portion of the track signal at frequency $F_1$ flows through the conductor 24 and at this time the receiving antenna 20 senses a substantially lower value of the track signal at frequency $F_1$ to indicate to the signal receiver 22 that a train vehicle is now located between the position of the transmitting antenna 18 and the position of the receiving antenna 20.

It should be noted that a signal transmitting antenna 28 operative with a signal transmitter at frequency $F_3$ is also positioned relative to the short circuiting connector 24 and is operative to sense the position of the train vehicle 14 in the position as shown in FIG. 1 in relation to a signal receiver operative at frequency $F_3$ which is not shown but would be located to the left of the system as shown in FIG. 1, but which would have been operative to sense the change in the received track signal at frequency $F_3$ upon the crossing of the short circuit connection associated with the signal receiving antenna coupled to the signal receiver operating at signal frequency $F_3$ upon the passing, by the train vehicle 14 of the location of the short circuiting connection associated with the receiving antenna for that signal receiver operating at frequency $F_3$.

In FIG. 2 there is schematically shown the arrangement of several successive signal transmitters and cooperative signal receivers in relation to the train vehicle track. In FIG. 2 there is shown the rails 10 and 12 with the short circuiting connection 26 being electrically connected between the rails 10 and 12 for the purpose of short circuiting any difference between the substantially large current propulsion currents passing through the rails 10 and 12 for the purpose of energizing the drive motors of the train and for the purpose of defining the track circuit signaling blocks. The next adjacent short circuit connection 24 is shown electrically connected between the rails and operative with the track signal receiving antenna 20. It should be noted that the track signal transmitting antenna 18 is coupled to the track rails 10 and 12 through its position at the location of the short circuiting connection 26. A track signal transmitting antenna 28 is coupled to the rails 10 and 12 at the location of the short circuit connection 24 to provide a track signal at frequency $F_3$ which is received by a track signal receiving antenna 30 operative with a short circuiting connection 32. A track signal transmitting antenna 34 is coupled to the track rails 10 and 12 at the location of the short circuit connection 32 for the purpose of energizing the track rails 10 and 12 with a track signal at frequency $F_2$ which is received by a track signal receiving antenna 36 operative with a short circuiting connection 38. A track signal transmitting antenna 40 is located at the position of the short circuit connection 38 for energizing the track rails 10 and 12 with a track signal at frequency $F_1$.

It should be noted that the track signal at frequency $F_1$ introduced by the signal transmitting antenna 18 is substantially isolated from the track signal at frequency $F_1$ introduced by the transmitting antenna 40 by the intermediate short circuiting connections 24 and 32.

In FIG. 3 there is provided an illustration of the induced current provided by the signal transmitting antenna 18 operative at the location of the short circuiting connection 26 to induce in the track rails 10 and 12 a track signal at frequency $F_1$ which is received by an antenna 20 operative with the short circuiting connection 24. In FIG. 3 there is illustrated an intermediately positioned signal receiver operative with receiving antennas 44 and 46 coupled to the respective track rails 10 and 12 for sensing the track signal at frequency $F_1$.

As the train vehicle moves in a direction from left to right, the front wheel carriage of the train vehicle will first pass the location of the short circuiting connection 24 such that the receiving antenna 20 will no longer sense a high value of the track signal at frequency $F_1$ from the transmitting antenna 18 and thereby through the signal receiver associated with the receiving antenna 20 an indication is provided that the train vehicle is located between the short circuiting connection 24 and the position of the transmitting antenna 18. However, the receiving antennas 44 and 46 are still operative to receive a high value of the track signal at frequency $F_1$ from the transmitting antenna 18 until the train vehicle wheel carriage passes the location of the receiving antennas 44 and 46. When the signal receiver 48 no longer receives a high value the track signal at frequency $F_1$ from the transmitting antenna 18 this indicates that the train vehicle is now located between the position of the receiving antennas 44 and 46 and the position of the transmitting antenna 18.

It should be noted that a practical distance between the short circuiting connection 24 and the short circuiting connection 26 in an actual embodiment of the present invention may be in the order of 2000 feet.

In FIG. 4 there is shown a successive plurality of signaling block arrangements to illustrate the separation of the respective track signals. The track rails 10 and 12 are short circuited by a short circuit connection 26 at the location of a signal transmitting antenna 18 operative to induce into the track rails 10 and 12 a track signal at frequency $F_1$. A signal receiving antenna 20 is operative with a short circuiting connection 24 which may be located a distance away from the short circuiting connection 26 in the order of 2000 feet or so. The receiving antenna 20 provides to an associated receiver the track signal at frequency $F_1$. A signal transmitting antenna 18 is provided at the location of the short circuiting connection 24 to energize the track rails 10 and 12 with a track signal at frequency $F_3$ which is received by a receiving antenna 30 operative with a short circuiting connection 32. A signal transmitting antenna 34 is provided at the location of a short circuiting connection 32 to energize the track rails 10 and 12 with a track signal, the frequency $F_2$ which is sensed by a receiving antenna 36 operative with a short circuiting connection 38. A transmitting antenna 40 is operative at the location of the short circuiting connection 38 for inducing in the track rails 10 and 12 a track signal at frequency $F_1$ which is received by a receiving antenna 50 operative with a short circuiting connection 52. A transmitting antenna 54 is operative at the location of the short circuiting connection 52 for inducing into the track rails 10 and 12 a track signal at frequency $F_3$ which is received by a receiver antenna 56 operative with a short circuiting connection 58. A signal transmitting antenna 60 is operative at the location of the short circuiting connection 58 for inducing into the track rails 10 and 12 a track signal at frequency $F_2$ which is received by a receiving antenna 62 operative with a short circuiting connection 64. Thusly it will be seen that three track signal frequencies are successively induced into the track rails 10 and 12 to form a plurality of substantially isolated track circuit blocks for the purpose of sensing the movement and position of a train vehicle moving in either direction along the track.

Figure 5:
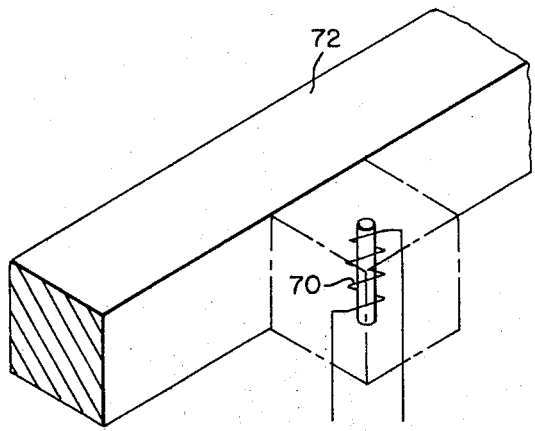
FIG. 5 illustrates one suitable technique for coupling one of the signaling transmitters into a typical short circuit connection.

FIG. 5 illustrates one suitable technique for coupling the signal receiving antenna 70 to a short circuiting connection or conductor 72 such that any track signal current flowing in the short circuiting connection 72 will be operative to induce a track signal into the antenna 70 which is operative with an associated signal receiver.

Figure 6:
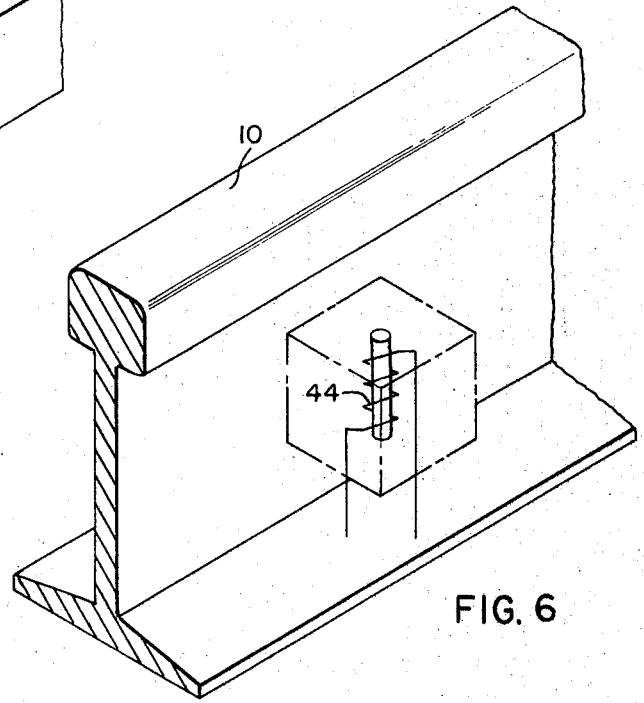
FIG. 6 illustrates one suitable technique for sensing the signaling current flowing in a track rail.

FIG. 6 illustrates one suitable technique for sensing the track signal current flowing in a track rail at an intermediate location, such as is accomplished by the antennas 44 and 46 shown in FIG. 3.

Figure 7:
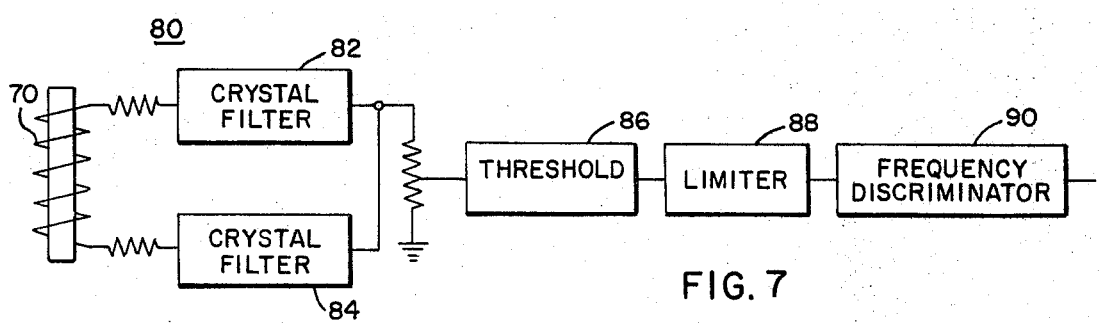
FIG. 7 illustrates one suitable form of a track circuit receiver.

In FIG. 7 there is shown a suitable form of a track circuit signal receiving circuit operative with a typical track signal receiving antenna, such as antenna 70 shown in FIG. 5, to detect the presence of the audio frequency track signal currents flowing in the short circuiting connection connected between the track rails. The track rails are short circuited at one end of a signal block by a short circuiting connection comprising a rather heavy bonding material such as a one inch square solid copper bar. If a train vehicle is present between the track signal transmitter and the track signal receiver, the amplitude of the received signal falls to a low value.

The received track signal sensed by antenna 70 shown in FIG. 7 passes through a filter 80 consisting of two crystal filters in parallel which are chosen so they will accept signals only from the associated track signal transmitter. The output of the filter 80 including the crystal filters 82 and 84 is passed to a threshold circuit 86 and then a signal limiter circuit 88 which gives a zero output for a small or low value received track signal and which output rises steeply to a maximum for a somewhat larger magnitude or high value received track signal. The signal level at which this change in output value occurs can be manually adjustable as a function of the distance between the receiver and its associated transmitter. The output signal is then passed to discriminator 90, the output of which is either a one or zero. This output can then be AC coupled to a sampling gate, the sample being that multiplex bit period assigned to the receiver. The sample is either a one or zero and is impressed on a multiplex information return line where it is decoded at a station and the reconstructed sequence of ones and zeros is compared bit by bit, with the sequence coded at the station for transmission via the multiplex by the track circuit transmitter associated with this receiver. The comparison is performed by AC coupled fail-safe AND gates, the circuitry being such that a single bit error in any sequence of six bits causes the output to vanish. This feature is described in greater detail in the referenced copending patent application. If the output is thereby missing or vanished for longer than a one second time period a vital control relay is caused to drop out indicating in a fail safe manner that the associated track circuit block is occupied by a train vehicle. In this manner detection of train circuits to an accuracy of better than plus or minus 25 feet is obtained at both ends of the track signaling block under all weather conditions.

In FIG. 8 there is illustrated the attenuation of the track signal passing through the track rails as a function of the distance between the track signal transmitter and the associated track signal receiver. In FIG. 8A there is illustrated the signal attenuation when track signal voltage is sensed by the receiver and a constant voltage source signal transmitter is utilized to energize the track rails; curve 100 illustrates the signal attenuation during dry track conditions and curve 102 illustrates the signal attenuation for wet track conditions. FIG. 8B illustrates the signal attenuation when track signal current is sensed by the receiver and a constant voltage source signal transmitter is utilized to energize the track rails; curve 104 illustrates the signal attenuation for dry track conditions and curve 106 illustrates the attenuation for wet track conditions. FIG. 8C illustrates the signal attenuation as a function of distance when track signal voltage is sensed by the receiver and a constant current transmitter is utilized to energize the track; curve 108 illustrates the signal attenuation for dry track conditions and curve 110 illustrates the signal attenuation for wet track conditions. In FIG. 8D there is illustrated the signal attenuation when track signal current is sensed by the receiver and a constant current source transmitter is utilized to energize the track circuit; curve 112 illustrates the signal attenuation for dry track conditions and curve 114 illustrates the signal attenuation for wet track conditions. It is contemplated that the track circuit signal operation illustrated by FIG. 8B will be utilized in accordance with the teachings of the present invention.

In FIG. 9 there is illustrated one receiving antenna arrangement to permit the position sensing of the vehicle 14 in relation to positions intermediate the location of the signal transmitting antenna 120 operative with a short circuit connection 122 and the signal receiving antenna 124 operative with the short circuiting connection 126. As the train vehicle 14, moving in a direction from right to left, passed the location of the short circuit connection 126 in its direction of movement towards the transmitting antenna 120, the track signal received by the antenna 124 dropped to a substantially low value to indicate to a receiver associated with the antenna 124 that the train vehicle had passed the location of the short circuiting connection 126. While the train vehicle 14 was located within the section A shown in FIG. 9, the receiving antenna 128 was still providing to its associated receiver a relatively high value output signal. However when the train vehicle 14 passed the location of the receiver antenna 128 its associated receiver received a substantially lower value output signal to indicate that the train vehicle had passed the antenna 128. During the time interval that the train vehicle is within the section B shown in FIG. 9 the antenna 130 is providing a high value output signal to its associated receiver. After the train vehicle 14 has passed the location of the antenna 130 its associated receiver receives a low value output signal. While the train vehicle 14 is within the section C shown in FIG. 9 the antenna 132 provides to its associated receiver a high value output signal, and when the train vehicle 14 passes the location of the antenna 132 the associated receiver receives a low value output signal. In this manner, due to the short circuiting effect of the train vehicle wheel structures, the movement of the train vehicle 14 through the successive sections within the track circuit signaling block defined by the short circuiting connections 122 and 126 can be sensed and monitored by receivers and associated control equipment operative with those receivers.

Figure 10:
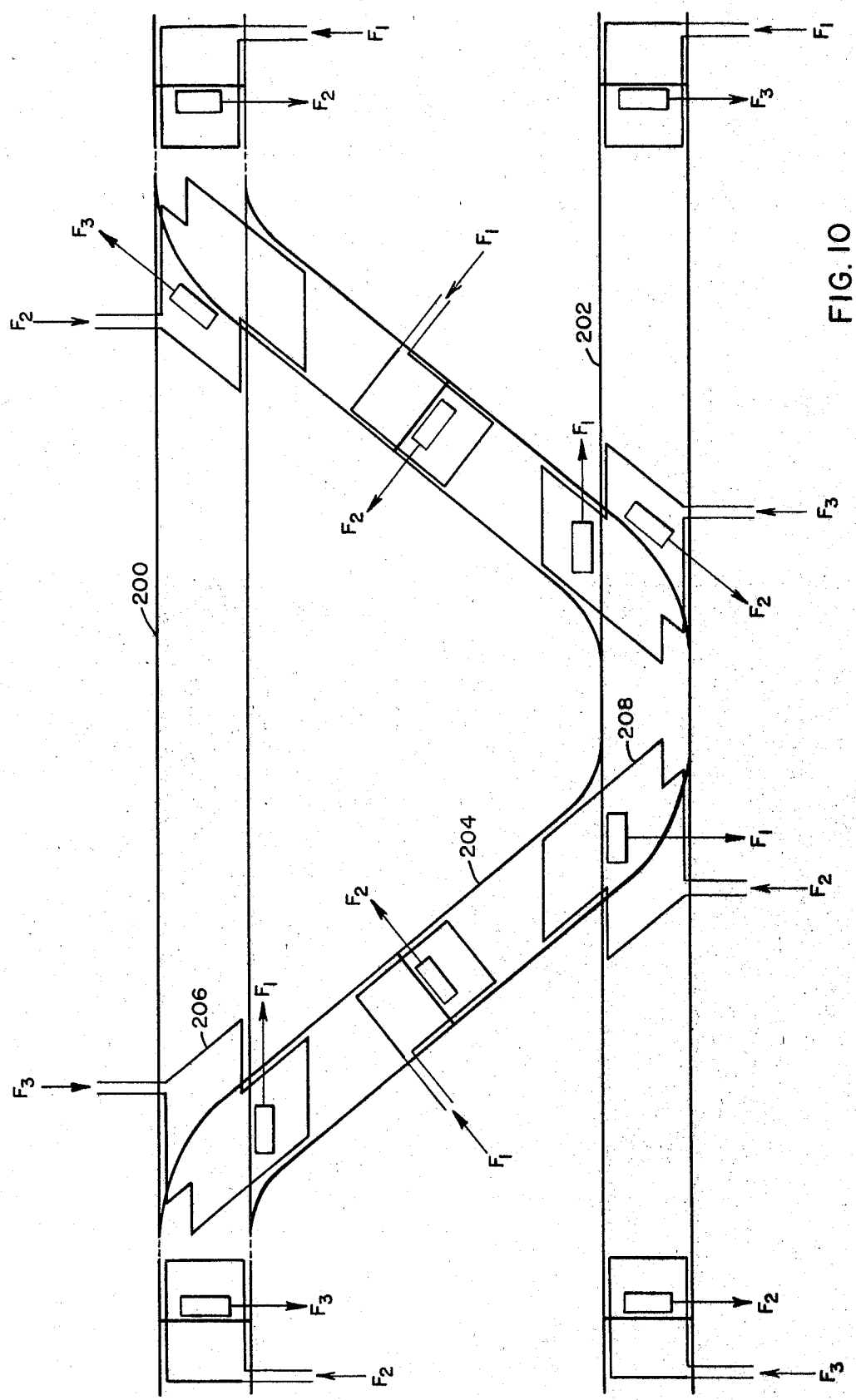
FIG. 10 generally illustrates one suitable signaling system arrangement in relation to a vehicle switch between two tracks.

In FIG. 10 there is generally illustrated a signaling system arrangement for operation in relation to a track switching section.

In FIG. 10 there is generally illustrated one suitable signaling system arrangement for introducing the desired track signals into adjacent train track 200 and 202 as well as into a track switching section 204. It should be noted that the portions of the rails at the respective ends of the track switching section 204 are operative as electric signal short circuiting connections because of the well known and conventional construction of track switches. Thusly the transmitting antenna 206 operative with a signal transmitter providing an $F_3$ track signal is arranged to be operative with the rail short circuit connection between the rails of the track 200 as well as to be operative with the rail short circuit connection between the rails of the track 202. The transmitting antenna 208 is similarly operative regarding the other end of the track switching section 204.

In accordance with the present invention a communication system has been described which will determine the presence of a train in a given section of track, for example where the track is built using welded and jointless rails. The system is designed such that any component failure or combination of failures that might disrupt the transmission of a track signal will result in a track occupied signal and is also operative such that certain points in a section of the track at the entry or exit of a train can be signaled with a very small tolerance as for example approaching a gate. In accordance with the invention, low impedance voltage sources are placed across the rails at intervals corresponding to the intervals known in conventional railway signaling as blocks and as shown in FIG. 1. These may be constructed in conjunction with short circuit connections spaced at intervals and connected between the rails. Track signal current sensors or receiving antennas are mounted on the rail short circuit connections such that the train movement and train position in relation to defined track blocks can be determined. With the train vehicle 14 as shown in FIG. 1 to the left of the short circuit connection 24, the short circuiting effect of the train wheels in parallel with the low impedance connection 24 connected between the track rails 10 and 12 has substantially little effect upon the track signal received by the antennas 20 and the associated signal receiver 22 which track signal is provided by the transmitting antenna 18 associated with signal transmitter 16. In this manner the track signal current sensed by the antenna 20 will remain at a high value as the vehicle approaches until the vehicle is very close to the low impedance connection 24. When the front truck wheels of the train vehicle 14 move to the right and pass the short circuiting connection 24, the received track signal current sensed by the antenna 20 will fall to a low value determined by the relative impedances of the wheel to wheel resistance of the trucks and the effective impedance of the associated track sections. The track signal current sensed by antenna 20 thereby reduces as a train passes by and additional wheel trucks are progressively placed across the rails to the right of the short circuiting connection 24 with the signal sensed by the signal receiver 22 reaching a value low enough to operate a switching circuit indicating thereby the presence of a train in the block to the right of the short circuiting connection 24 and between the antenna 20 and the transmitting antenna 18.

As shown in FIG. 9 as the train vehicle is to the right of the short circuiting connection 126 the antenna 124 and its associated receiver will receive a high value output signal which will decrease slightly as the wheels of the train vehicle approach from the right the short circuit connection 126. As the train passes the short circuit connection 126 the antenna 124 will provide a substantially reduced output signal to its associated receiver. As the train moves toward the antenna 128 the short circuiting effect of the train wheels causes the signal current at frequency $F_1$ measured by the antenna 128 to rise since the impedance to the right of the antenna 128 is falling somewhat at the approach of the train. The presence of the sensed track current received by the antenna 128 however indicates to appropriate decision-making equipment that there is no train in section B, C or D. Since the antenna 124 is indicating a train someplace between the short circuiting connection 126 and the short circuiting connection 122 it is known by the decision making equipment that the train is within section A. As soon as the front trucks of the train pass to the left of the antenna 128 the current measured by the antenna 128 falls to a minimum value. In this case however, the impedance to the right of antenna 128 is higher than was the case as the trucks passed the short circuiting connection 126 giving a more precise indication of the passage of the front trucks. Furthermore, since the track circuit current sensing antenna 128 is closer to the transmitting antenna 120 the variation of standing current at the antenna 128 in the absence of a train because of ambient weather changes is lower. Hence, the determination to a falling current below the minimum which must be allowed to cope with ambient weather changes is easier to make. When the front trucks of the train vehicle have moved into section C illustrated in FIG. 9, the antennas 128 and 130 indicate a low output signal and it is known that there is a train in section C. The antenna 128 is still indicating that section B is occupied which is a restrictive and safe train control condition. As the train approaches and passes the antenna 132 the current at frequency $F_1$ measured by the antenna 132 rises as the train approaches and then sharply falls with a substantial precision to determine the location of the train because the change in sensed track signal current at frequency $F_1$ is now very marked. As the front trucks of the train vehicle pass into section E the short circuiting effect of the trucks loads the transmitter associated with the antenna 120 beyond the dynamic range at which it presents a low output impedance. This is restricted in order to prevent destruction of the transmitter and the output is therefore current limited when the train is very close to the transmitter. And therefore, the current to the right of the transmitter antenna 120 is at a low value and the current sensing antennas 132, 130, 128 and 124 are still indicating the presence of a train in sections B, C and D. This is of course a restrictive and safe train control indication. When the train is safely positioned to the left of the location of the transmitting antenna 120, then the current at frequency $F_1$ sensed by the antennas 132, 130, 128 and 124 increases sufficiently to indicate that sections A, B, C and D are clear of a train vehicle.

If the train vehicle had been considered to be approaching from left to right in reference to FIG. 9, the precise indication of train vehicle exit from section D would be given by a marked increase in the sensed track signal received by the antennas 132 and its associated signal receiver. A somewhat less precise indication of the exit of the train vehicle from section C would be indicated by the antenna 130 and its associated receiver and so forth. Since information of the magnitude of the current at frequency $F_1$ is known at each respective track signal current sensing antenna 132, 130, 128, and 124 appropriate decision making equipment can determine entry and exit of a train with high precision.

Because of the low impedance short circuiting connections 122 and 124 between the track rails, any propulsion currents flowing in the respective rails will be substantially divided equally and if a pair of receiving antennas such as illustrated for antennas 128, 130, and 132 are utilized then a high degree of cancellation of electrical interference caused by the propulsion currents can be obtained. The present disclosure has indicated the use of different track signal frequencies and it should be apparent that these frequencies may be again utilized further down the track at locations remote from the similar frequency signal transmitters.

The signaling system here described provides the ability to sense the presence and position of an electrically conductive steel tired vehicle on steel rails with high precision, without the use of expensive track section insulating joints, and therefore allowing the use of long sections of welded rail by appropriate construction of the illustrated short circuit connections. A substantial reduction in the number of track signal frequencies is permitted. By sensing track signal currents, and due to the fact that the impedance seen by the voltage sources falls, as the track becomes wet by rain or the like the current transmitted down the track rail increases which tends to cancel the increase in attenuation at the remote end of the track circuit block under wet conditions. By appropriate choice of driving and terminal impedances the variation and signal strength at various points along the track circuit block can be allocated to be substantially as desired at each point. This is clearly a substantial improvement compared to the traditional voltage sensors used on prior art track signal circuits in which the voltage near the voltage source changes very little under track conditions but the voltage at remote point changes substantially with various wet or dry track conditions.

Train movement command signals are in general supplied by the transmitting antenna ahead of the train. Train position or presence is monitored by each of the track signal receiving antennas in the entire system being operative continuously with its associated signal block to indicate to provide wayside logic equipment whether its particular block is occupied or unoccupied regardless of train direction.

Train detection requires only the three carrier frequencies as here described and shown in the drawings. Security and fail-safe considerations require modulation off these three carrier frequencies; this can be done by amplitude, phase or frequency modulation. The signal modulation presence provides an additional equipment security factor in addition to the presence of carrier frequency signal. For train command purposes, the signals are modulated to give train speed control as desired. For presence detection purposes the presence and accuracy of the signal modulation is also confirmed which provides additional equipment security since this permits a comparison of the signal modulation received with known signal modulation that was transmitted.

The present invention has been described with a certain degree of particularity however, it should be understood that various modifications and changes in the construction and arrangement of parts may be made within the scope of the present invention.

I claim as my invention:

1. For use with a signal block system for a railway track comprising a pair of conductively continuous rails divided into a succession of contiguous signal blocks operative for a given direction of railway vehicle motion, each signal block having an associated wayside signal source disposed adjacent its exit end and operative to provide an alternating current block signal having a predetermined characteristic different from those of the signals provided to adjacent signal blocks, each signal block having an associated wayside block signal utilization means disposed adjacent its entrance end, the combination of:

means providing an alternating current signal short circuiting connection electrically connected between the pair of rails at each boundary between contiguous signal blocks, signal block input coupling means adjacent each signal block boundary for coupling the alternating current block signal from the associated signal source to the track rails, and signal block output coupling means adjacent each signal block boundary for coupling the signal flowing through the short circuit connection disposed thereat to the associated block signal utilization means, said signal block input coupling means being operative to couple said alternating current block signal from the wayside signal source to at least two expanses of rail comprising a first predetermined expanse located along one of the pair of rails and a second predetermined expanse located along the other of the pair of rails, said first and second expanses of rail being disposed to one and the other side of the signal block boundary and mutually cooperative to provide counterbalancing signal potentials in a circuit through said block signal short circuiting connection.

2. The apparatus of claim 1, with said signal block input coupling means further being operative to couple said alternating current block signal to a third predetermined expanse of rail located along said one of the pair of rails and to a fourth predetermined expanse of rail located along said other of the pair of rails and disposed to the other and the one sides of the block boundary, respectively, said third and fourth expanses having a cooperative relationship like that of the first and second expanses.

3. The apparatus of claim 1, with:

the alternating current short circuit connection at each boundary being a substantially linear conductor, and the signal block output coupling means comprising an induction coil having its magnetic axis normal to the conductor.

4. The apparatus of claim 1, with the at least two expanses of rail adjacent each signal block boundary being contiguous to said boundary.

5. The apparatus of claim 1, with:

the alternating current block signal provided by the signal source adjacent the exit end of a given signal block having a predetermined frequency different from the frequencies of those signals provided to adjacent signal blocks, the block signal utilization means associated with said given signal block being selectively responsive to said predetermined frequency.

6. The apparatus of claim 1, with the block signal utilization means associated with the entrance end of each signal block comprising an electro-responsive means operative to yield one output condition when a railway vehicle is not located between the exit and entrance ends of the signal block, and to yield another output condition when a railway vehicle shunts the track rails at a position therealong between said ends.

7. For use with a signal block system for a railway track comprising a pair of conductively continuous rails divided into a succession of contiguous signal blocks operative for a given direction of railway vehicle motion, each signal block having an associated wayside signal source disposed adjacent its exit end and operative to provide an alternating current block signal having a predetermined characteristic different from those of the signals provided to adjacent signal blocks, each signal block having an associated wayside block signal utilization means disposed adjacent its entrance end, the combination of:

means providing an alternating current signal short circuiting connection electrically connected between the pair of rails at each boundary between contiguous signal blocks, signal block input coupling means adjacent each signal block boundary for coupling the alternating current block signal from the associated signal source to the track rails, and signal block output coupling means adjacent each signal block boundary for coupling the signal flowing through the short circuit connection disposed thereat to the associated block signal utilization means, said signal block input coupling means comprising a substantially rectangular roadbed inductive loop having two of its legs parallel to and adjacent the rails and the other two of its legs perpendicular to the rails and equidistantly spaced to one and the other sides of the signal block boundary.

8. For use with a railway track comprising a pair of conductively continuous rails with a sequence of predefined spaced signaling block boundary positions therealong, the combination of:

means for forming a low impedance signal path electrically connected between the rails at each boundary position;

signal source means operative to furnish an alternating current track circuit signal at each boundary position having a predetermined signal characteristic different from those of signals furnished at adjacent boundary positions, signal detection means operative at each boundary position to detect the presence in said low impedance signal path of a signal having the predetermined signal characteristic of a signal furnished at an adjacent boundary position, track circuit signal input coupling means operative at each boundary position, with each said input means being operative to introduce the signal furnished for that position with components of introduced signals inputted to one and the other rails in such a manner that said components are in a series aiding relationship in a track circuit through the low impedance signal paths at the next preceding and the next succeeding boundary positions, but in a series opposing relationship in a track circuit through the low impedance signal path at the associated boundary position, to thereby minimize interference by the locally introduced signal upon detection of the signals introduced at adjacent boundary positions.

9. The apparatus of claim 8, with:

each track circuit signal input coupling means being an inductive apparatus for inductively impressing the components of introduced signal into one and the other rails, the inductive apparatus and said means forming the low impedance signal path at each boundary position being cooperative to result in a series opposing relationship of said conductively impressed components in a track circuit through the low impedance signal path at the associated boundary position.

10. The apparatus of claim 8, with:

said means for forming a low impedance signal path including a first conductor having predetermined form relative to the track rails, said track circuit input coupling means comprising a second conductor forming an inductive coupling conductor of a predetermined shape cooperative with the rails and the first conductor to provide introduction of said signal to the rails with components of introduced signals having the aforesaid relationships.

11. The apparatus of claim 8, with said track circuit input coupling means at each boundary position comprising a substantially rectangular roadbed inductive loop having two of its legs parallel to and adjacent the rails and the other two of its legs perpendicular to the rails and equidistantly spaced to one and the other sides of the boundary position.

12. The apparatus of claim 8, with:

the alternating current track circuit signal furnished at a given block boundary position having a predetermined frequency different from the frequencies of those signals furnished at adjacent block boundary positions, the signal detection means at said given boundary position being operative to selectively detect a signal having a frequency which is furnished at an adjacent block boundary position.

References Cited

UNITED STATES PATENTS

| | | | |
|---|---|---|---|
| 3,328,580 | 6/1967 | Staples | 246—34 |
| 3,328,581 | 6/1967 | Staples | 246—34 X |
| 3,345,512 | 10/1967 | Failor | 246—122 X |
| 3,359,416 | 12/1967 | Wilcox | 246—122 X |

FOREIGN PATENTS

| | | |
|---|---|---|
| 840,011 | 7/1960 | Great Britain. |
| 855,549 | 12/1960 | Great Britain. |

ARTHUR L. LA POINT, Primary Examiner

G. H. LIBMAN, Assistant Examiner

U.S. Cl. X.R.

246—122